United States Patent [19]

Winkler et al.

[11] Patent Number: 4,957,962
[45] Date of Patent: Sep. 18, 1990

[54] FIBER COMPOSITES

[75] Inventors: Matthias Winkler; Peter Ittemann, both of Ludwigshafen; Gerhard Heinz, Weisenheim, all of Fed. Rep. of Germany

[73] Assignee: BASF Aktiengesellschaft, Ludwigshafen, Fed. Rep. of Germany

[21] Appl. No.: 271,238

[22] Filed: Nov. 14, 1988

[30] Foreign Application Priority Data

Nov. 14, 1987 [DE] Fed. Rep. of Germany ....... 3738749

[51] Int. Cl.$^5$ .......................... C08K 7/04; C08K 7/14; C08L 61/18; C08L 77/00
[52] U.S. Cl. .................................... 524/538; 525/420; 525/471; 525/535; 525/536
[58] Field of Search ............... 525/471, 535, 536, 420; 524/538

[56] References Cited

U.S. PATENT DOCUMENTS

| 4,649,080 | 3/1987 | Fischer et al. | 523/222 |
| 4,764,397 | 8/1988 | Fischer et al. | 524/540 |

FOREIGN PATENT DOCUMENTS

| 0187340 | 2/1985 | European Pat. Off. . |
| 176988 | 4/1986 | European Pat. Off. . |
| 176989 | 4/1986 | European Pat. Off. . |
| 224236 | 6/1987 | European Pat. Off. . |

*Primary Examiner*—Allan M. Lieberman
*Attorney, Agent, or Firm*—Oblon, Spivak, McClelland, Maier & Neustadt

[57] ABSTRACT

Fiber composite useful in automotive construction and the aerospace industry are composed of a plastics matrix and reinforcing fibers, this plastics matrix comprising a mixture of from 90 to 40% by weight of polyether sulfone and 10 to 60% by weight of polyether ketone.

10 Claims, No Drawings

FIBER COMPOSITES

The present invention relates to fiber composites, comprising a highly heat-resistant thermoplastic and oriented continuous reinforcing fibers, with improved mechanical properties.

Polyether sulfones and polyether ketones are thermoplastics which are notable for their heat resistance. Composites from these thermoplastics and oriented continuous reinforcing fibers have good strength properties and therefore are suitable for use as highly stressable heat-resistant engineering materials. For instance, prepregs from carbon fiber reinforced polyether sulfones or polyether ketones are used for building components for aircraft.

Composites from polyether ketone prepregs do not show sufficient heat distortion resistance for many applications, the shear modulus at 200° C. being more than 50% lower than that at room temperature, which is no longer tolerated for example by the aircraft industry for highly stressed components.

Composites from polyether sulfone prepregs, it is true, do not show this marked drop in the heat distortion resistance on going from room temperature to 200° C., but in the case of unidirectional fiber reinforcement they show a transverse strength which is more than 25% lower than that of the unreinforced material, this discrepancy being due to inadequate adhesion between the plastics matrix and reinforcing fibers. In addition, polyether sulfone moldings are vulnerable to attack by organic solvents and, what is more, have a low stress crack resistance.

It is known that by admixing polyether ketone into polyether sulfone it is possible to improve to some extent the stress crack resistance of moldings produced therefrom. Such polyblends are described in EP-A-No. 176,988 and -176,989. It is also mentioned there that the mixtures may contain customary additives, for example glass fibers. EP-A-No. 224,236 describes polyether ketone/polyether sulfone blends which contain an admixture of fillers, for example short glass or carbon fibers. The fiber composites incorporating oriented continuous fibers and their advantageous properties however, are not described.

It is an object of the present invention to provide fiber composites of high heat distortion resistance which, compared with polyether sulfone prepregs, show a much improved stress crack resistance and transverse tensile strength and also superior fire behavior.

We have found that this object is achieved by using a mixture of from 90 to 40, preferably from 80 to 50, % by weight of a polyether sulfone and from 10 to 60, preferably from 20 to 50, % by weight of a polyether ketone as plastics matrix The polyether sulfones are linear oxy- and sulfonyl-containing aromatic high polymers having a reduced specific viscosity of 40 to 150 ml/g (measured in 0.5% strength in 1:1 phenol/o-dichlorobenzene at 25° C.). They are prepared by nucleophilic polycondensation of bisphenols with dihaloaromatics which are activated in the para-position by electron-withdrawing groups, at least one of the starting components containing an —$SO_2$— group. If in this polycondensation one of the monomers or even both are partly replaced by other kinds of monomers, including those which contain no $SO_2$ groups, the products are corresponding copolymers which, depending on the reaction management, contain the comonomers in random distribution or in block distribution.

Particularly preferred polyether sulfones are those having the structures:

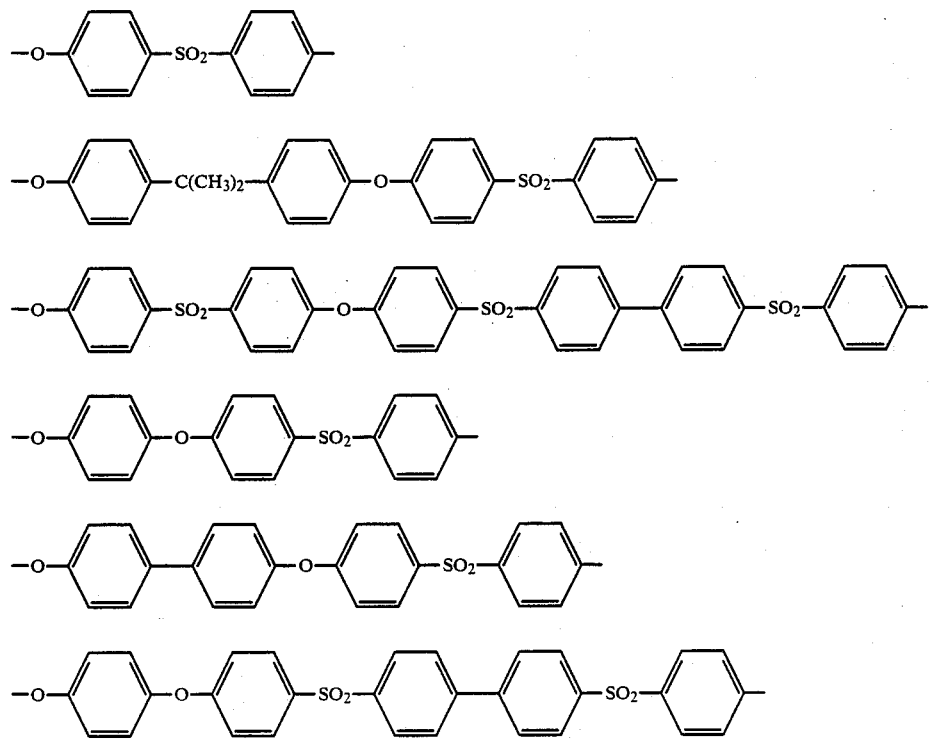

-continued

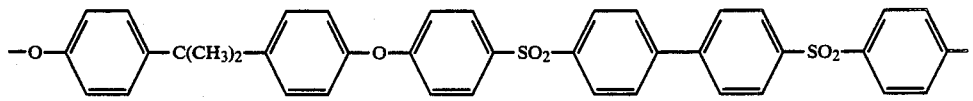

Polyether ketones are linear oxy- and keto-containing aromatic high polymers, preferably having a reduced specific viscosity of from 60 to 160 ml/g measured in 1% strength in concentrated sulfuric acid at 25° C.). They can be prepared by nucleophilic polycondensation of bisphenols with activated dihaloaromatics, at least one of the starting compounds containing a —CO— group and acceptable products again including copolymers. However, they can also be prepared by Friedel-Crafts polycondensation either of aromatic acid halides or of aromatic diacid halides with polycyclic oxy-containing aromatics carrying no fewer than two activated hydrogen atoms, and again copolymers are possible.

Particularly preferred polyether ketones are those having the structures:

as parallel laid fabrics or as woven or knitted fabrics. The volume ratio of plastic:reinforcing fibers is within the range from 70:30 to 20:80, preferably from 55:45 to 35:65.

The fiber composites according to the invention can be produced in various ways.

In a preferred embodiment, polyether sulfone and polyether ketone are mixed in melt form, and this melt is used to impregnate the reinforcing fibers.

In another preferred embodiment, the melt of the polymer mixture is spun into fibers and these fibers are processed together with reinforcing fibers into a hybrid yarn (see EP No. 156,599), from which a woven or knitted fabric may be produced. Press molding above the softening point of the polymer then produces the composite material.

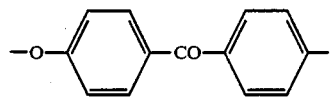

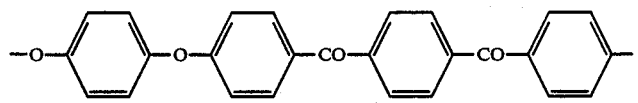

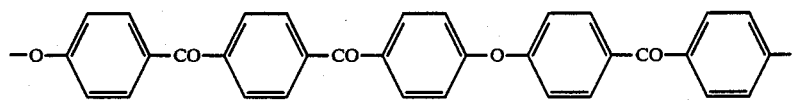

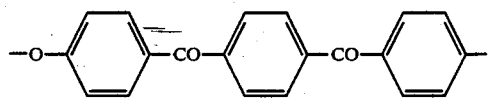

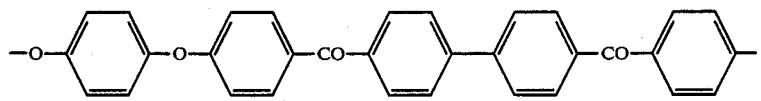

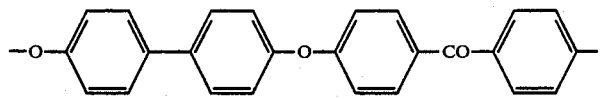

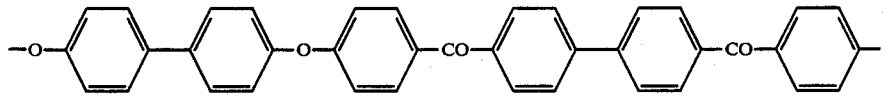

Possible reinforcing fibers are those made of glass, carbon or aromatic polyamides. They are present in the fiber composite as continuous fibers oriented in certain preferred directions. To produce the composite materials, the fibers, which may carry customary adhesion promoters and sizes, can be used as individual rovings, In a further preferred embodiment, fine powders of the polymers are mixed thoroughly, and this powder mixture can then either be applied directly to the reinforcing fibers in a fluidized bed, or it can be dispersed in water with the aid of suitable emulsifiers, and this dispersion then be used to impregnate the fibers.

Finally, it is also possible to dissolve the polymers in suitable solvents (possibilities are p-chlorophenol and concentrated sulfuric acid) and to use this solution to impregnate the fibers.

The fiber composites can be present as prepreg rovings which can be wound, for example onto cores and processed into hollow articles. Sheetlike laminates can be draped on top of one another if desired in various directions of orientation, and press-molded together.

The fiber composites according to the invention have an increased heat distortion resistance at 200° C. compared with those based on polyether ketone.

Compared with fiber composites based on polyether sulfone they show a much improved stress crack resistance to aggressive media. It is true that it was likely that the stress crack resistance would be somewhat improved since polyether ketones, unlike polyether sulfones, are not soluble in organic solvents However, the extent of the improvement was not foreseeable, including in particular the fact that the stress crack resistance of the fiber composites according to the invention is better than that of corresponding materials without reinforcing fibers. A further advantage over fiber composites based on polyether sulfone is the improved adhesion between plastics matrix and fibers, which leads to an improved transverse tensile strength, from 80 to 100% of the transverse tensile strength of the fiber-free material being obtained. Finally, the fiber composites according to the invention also have more favorable fire properties compared with prepregs based on polyether sulfone.

The fiber composites can be used for building components for the automotive and aerospace industries or more general engineering.

In the Examples, the parts and percentages are by weight.

EXAMPLE 1

A granular mixture of 9 kg of poly(ether ketone ether ketone ketone) (—[O—Ph—CO—Ph—O—Ph—CO—Ph—CO13 Ph]$_n$) and 21 kg of polyether sulfone (Ultrason E 2000 from BASF AG) ([—O—Ph—SO$_2$—Ph—]$_n$) was extruded on a ZSK-53 extruder from Werner & Pfleiderer at an external temperature of 360° C., and the hot extrudate was cooled in a water bath and dropped in a granulator.

This material was used for melt impregnating carbon fibers.

Parallel C-fiber rovings were continuously passed at a speed of 0.2 m/min through a slot die from which the abovementioned material was extruded. Complete impregnation of the reinforcing fibers was obtained with 4 heated deflecting rolls.

A semifinished material obtained with a matrix content of 40% by volume was press-molded into test specimens whose transverse tensile strength was tested in accordance with German Standard Specification DIN No. 53,504 as 88N/mm$^2$, corresponding to 98% of theory.

EXAMPLE 2

18 kg of polysulfone powder ([—O—Ph—SO$_2$—Ph—O—Ph—SO$_2$—Ph—]$_n$) were intensively mixed with 12 kg of polyether ether ketone powder (Victrex PEEK 450 P from ICI) ([—O—Ph—O—Ph—CO13 Ph—]$_n$).

This powder was dispersed in a 1.5% strength polyacrylic acid solution in water. The dispersion was stabilized by neutralization with NaOH (pH=7). A continuous glass fiber roving was impregnated by means of this dispersion and laid close together on a drum. After the laid fabric thus produced had been dried in air, it was cut open parallel to the axis of the drum, removed from the drum and processed by press-molding into a unidirectionally reinforced test specimen 76×350 cm in size. This material was tested in respect of its fire behavior in accordance with FAR § 25.853.

A burned length (on flaming in accordance with requirements class A) of 59 mm was determined.

EXAMPLE 3

A granular mixture of 6 kg of polyether ketone ([—O—Ph—CO—Ph—]$_n$) and 24 kg of polysulfone (Ultrason S 2000 from BASF AG) ([—O—Ph—SO$_2$—Ph—O—Ph—C(CH$_3$)$_2$—Ph]$_n$) was extruded on a ZSK-53 extruder from Werner & Pfleiderer at an external temperature of 350° C., and the hot extrudate was cooled down in a water bath and chopped in a granulator. The granules obtained were processed further.

A 933 dtex multifilament polymer yarn comprising 140 individual filaments was melt spun. This yarn was intensively mixed in a hybrid yarn apparatus with a 2000 dtex carbon fiber comprising 3000 individual filaments.

The hybrid yarn formed was wound onto a rectangular frame and then converted by hot pressing into a unidirectionally reinforced sheet of composite material.

Test specimens taken from this sheet gave a transverse tensile strength (German Standard Specification DIN No. 53,504) of 63N/mm$^2$, which corresponds to 89% of theory.

We claim:
1. A fiber reinforced composite containing:
   (1) from 80 to 30% by volume of oriented continuous reinforcing fibers, and
   (2) from 20 to 70% by volume of a highly heat-resistant thermoplastic mixture containing from 90 to 40% by weight of a polyether sulfone and from 10 to 60% by weight of one or more of a polyether ketone containing only oxo- and keto-bridging groups.
2. The composite of claim 1, wherein:
   said thermoplastic mixture contains from 30 to 50% by weight of polyether sulfone and from 50 to 20% by weight of polyether ketone.
3. The composite of claim 2, wherein said polyether ketone is:

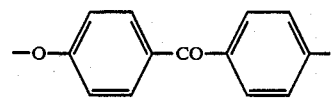

4. The composite of claim 2, wherein said polyether ketone is:

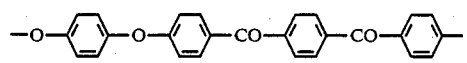

5. The composite of claim 2, wherein said polyether ketone is:

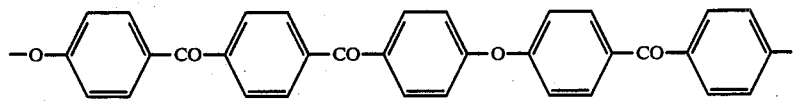
6. The composite of claim 2, wherein said polyether ketone is:
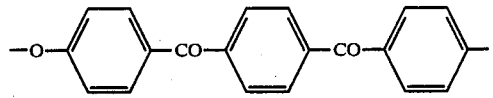
7. The composite of claim 2, wherein said polyether ketone is:
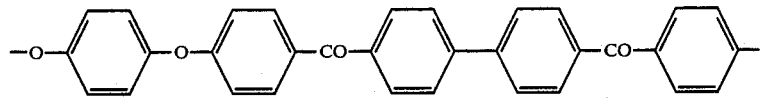
8. The composite of claim 2, wherein said polyether ketone is:
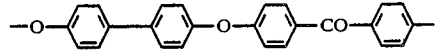
9. The composite of claim 2, wherein said polyether ketone is:
10. The composite of claim 2, wherein said polyether ketone is:
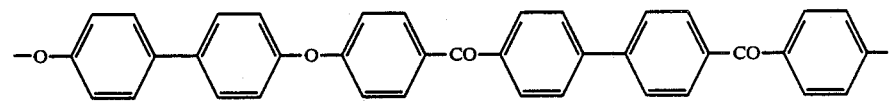
* * * * *